Dec. 10, 1929.   C. PULLIAM   1,739,417
TRANSMISSION MECHANISM
Filed Sept. 22, 1927   7 Sheets-Sheet 1

Inventor
Clarence Pulliam,
By
Attorneys

Dec. 10, 1929.　　　　C. PULLIAM　　　　1,739,417
TRANSMISSION MECHANISM
Filed Sept. 22, 1927　　　7 Sheets-Sheet 2

Inventor
Clarence Pulliam,
By
Attorneys

Patented Dec. 10, 1929

1,739,417

UNITED STATES PATENT OFFICE

CLARENCE PULLIAM, OF DETROIT, MICHIGAN

TRANSMISSION MECHANISM

Application filed September 22, 1927. Serial No. 221,211.

The present invention pertains to a novel transmission mechanism of the same general character as that shown in my co-pending application, Serial No. 757,402, allowed April 13, 1927, Patent Number 1,648,027.

In common with my previous device, the present device includes a plurality of shafts for the several speeds, each shaft carrying a clutch member which may selectively be brought into driving relation with the flywheel. For actuating the several clutch members corresponding to the shafts, the prior device embodies independent and slidable sleeves linked to an operating pedal or other device and joined to the clutch members.

The present invention overcomes the necessity of the several complete and independent clutches and replaces the same by a novel sectional clutch adapted to transmit power to any one of a number of shafts and in which certain common elements operate for all adjustments. The clutch members which are thus brought into operative condition drive the corresponding shafts and transmit their power to the propeller shaft.

A countershaft is interposed between the propeller shaft and the transmission shafts. Differential clutches are mounted on the countershaft and on one of the transmission shafts and are designed to open or lock according to the speeds of the rotated parts. The transmission shaft which carries the clutch is geared to the countershaft through these clutches, and the actual driving relation between the shafts and through the clutches depends on the locked condition of the latter which in turn is determined by the speeds of the parts involved. The construction and adjustment of the clutches are such as to drive the countershaft in keeping with the desired speed to be imparted to the propeller shaft.

The invention is fully disclosed in the following description and in the accompanying drawings, in which—

Reference to these views will now be made by use of like characters which are employed to designate corresponding parts throughout.

The longitudinal sectional views show a drive or power shaft 1 driven by the motor and having one end flanged as at 2 for the attachment of a hollow flywheel 3 by means of bolts 4. The flywheel as well as other parts of the transmission mechanism is enclosed in a transmission housing 5 having cover plates 6 and 7 in the top thereof for access to the interior. The housing has an intermediate partition 8 in which is disposed a ball bearing assembly 9 for accommodating certain rotary parts, presently to be described.

Similarly, the rear end of the housing has a plate 10 containing a ball bearing assembly 11 for supporting a propeller shaft 12 at an intermediate point thereof. The bearing assembly 9 is considerably larger than the propeller shaft in order to accommodate surrounding members. One of these members is a sleeve 13 immediately surrounding the shaft and extending from a point slightly rearward of the forward end of the propeller shaft to a point somewhat spaced forwardly from the bearing 11. This sleeve functions in second or intermediate speed and may therefore be termed the second speed transmission member. The sleeve 13 is surrounded in turn by a similar sleeve 14 which fits in the bearing 9 and extends from a point rearward of the forward end of the sleeve 13 to a point just beyond the bearing 9. The third or high speed is effected as a direct drive from the shaft 1 through the propeller shaft 12 as will presently appear.

Figures 8, 9, 10:
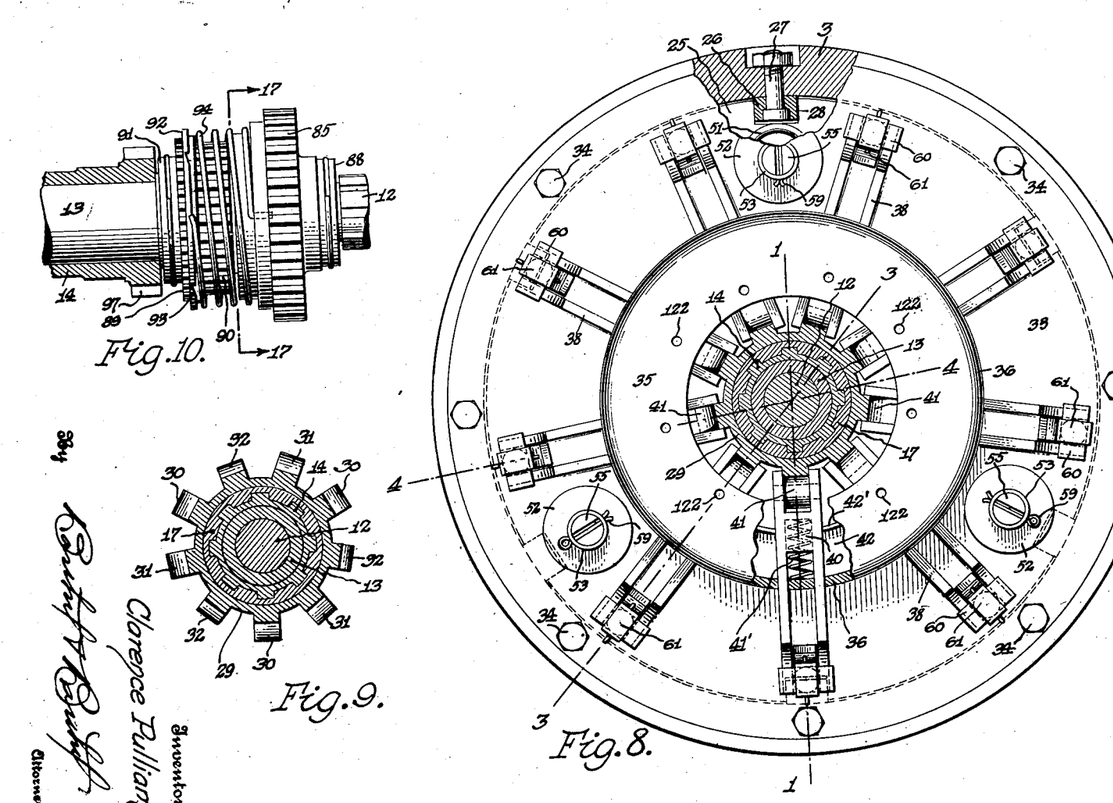
Fig. 8 is a section on the line 8—8 of Figure 1, parts being broken away for the purpose of illustration.
Fig. 9 is a detail of Figure 8, showing more clearly the construction of the cam spider which actuates the cam fingers.
Fig. 10 is an elevation, partly in section, of the differential clutch assembly on the propeller shaft.

Within the hollow pulley 3 is disposed a friction clutch built partly upon three flanged collars 15, 16 and 17 splined respectively on the forward ends of the propeller shaft 12, second speed sleeve 13 and first speed sleeve 14. To these flanged collars are secured friction disks 18, 19 and 20 of equal external circumference and having marginal friction rings 21 secured to both faces thereof by pins 22. Intermediate the disks 18, 19 and 20 are inserted section control rings 23, 24 and 25. These members are keyed to the flywheel 3 by means of key blocks 26 held to the inner circumference of the flywheel by bolts 27 and disposed in notches 28 cut in the peripheries of the rings as shown more clearly in Figures 1 and 8. It will be seen in Figure 8 that three such locking assemblies are provided, although the actual number may be determined according to conditions.

The flanged collar 17 is surrounded by a sleeve 29 at one end of which is formed a cam spider comprising a number of cams of different dimensions. It will be seen in Figure 9 that there are three sets of cams, each set comprising three similar members. The cams 30 correspond to first or low gear; the cams 31 of greater height correspond to second or intermediate speed, and the lower cams 32 correspond to high speed. The cams are positioned around the spider in the order 30, 32, 31. Not only are these cams of different height, but the lengths of the rise or level portion are unequal. Among the several sets the lengths of the rises increase in the order 30, 31, 32 or in the order of speeds.

Figures 1, 2:
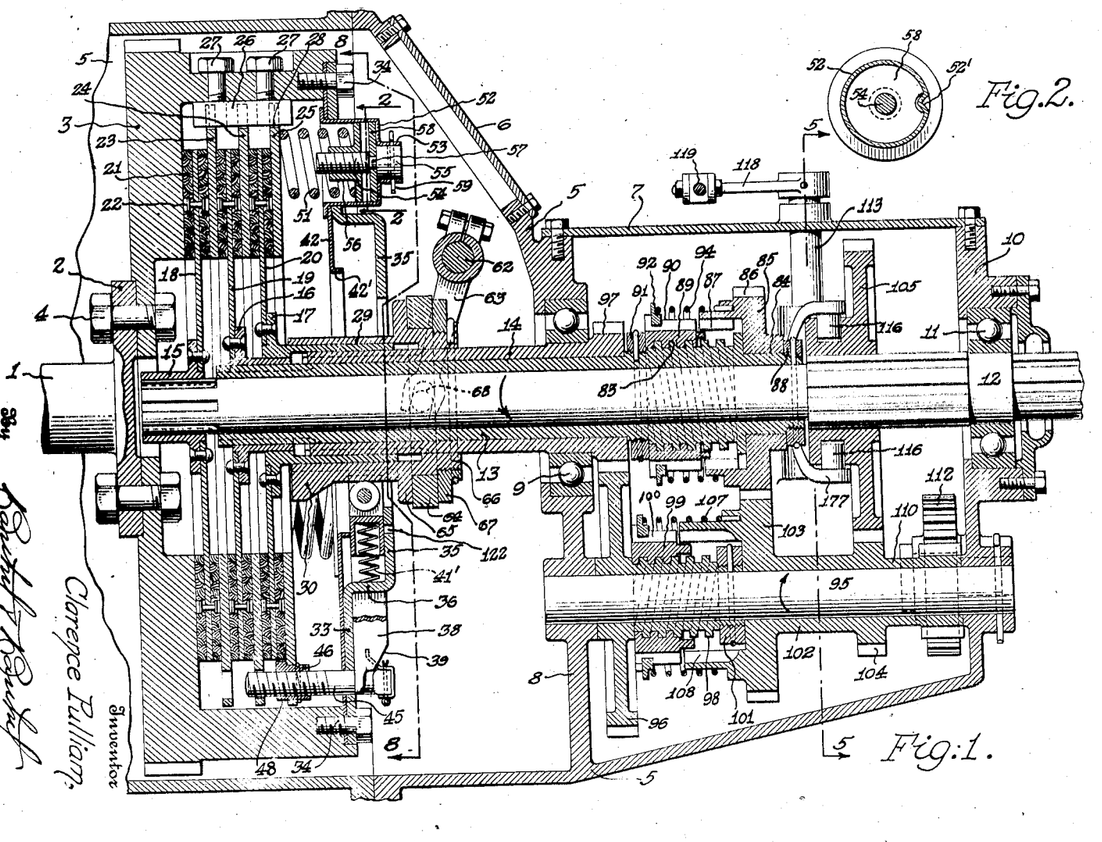
Figure 1 is a longitudinal section of the device in high speed or direct drive position, taken on the line 1—1 of Figure 8.
Fig. 2 is a detail section on the line 2—2 of Figure 1.

The open side of the pulley 3 is closed by a cover plate or cage 33 held by bolts 34. This member has an outward depression 35 having its circular wall 36 formed with pairs of slots 37 equal in number to the cams. Each pair of slots is penetrated by a cam finger consisting of a bifurcated member 38 having sloped or cam surfaces 39 formed on the lower end thereof. The member is held unitary by an intermediate bridge piece 40 above which is journalled a roller 41. These rollers ride on the several cams 30, 31 and 32 and are maintained in engagement therewith by springs 41' seated in the bridges 40 and bearing on the circular wall of the depression 35 as shown in Figure 1. Within the cover plate 33 is an inner ring 42 having a flange 42' bent from its inner circumference to engage the several fingers on one side thereof. The opposite sides of the fingers engage the base of the depression 35, whereby the fingers are guided for straight line movement radially of the flywheel.

Figures 3, 4, 5, 6, 7:
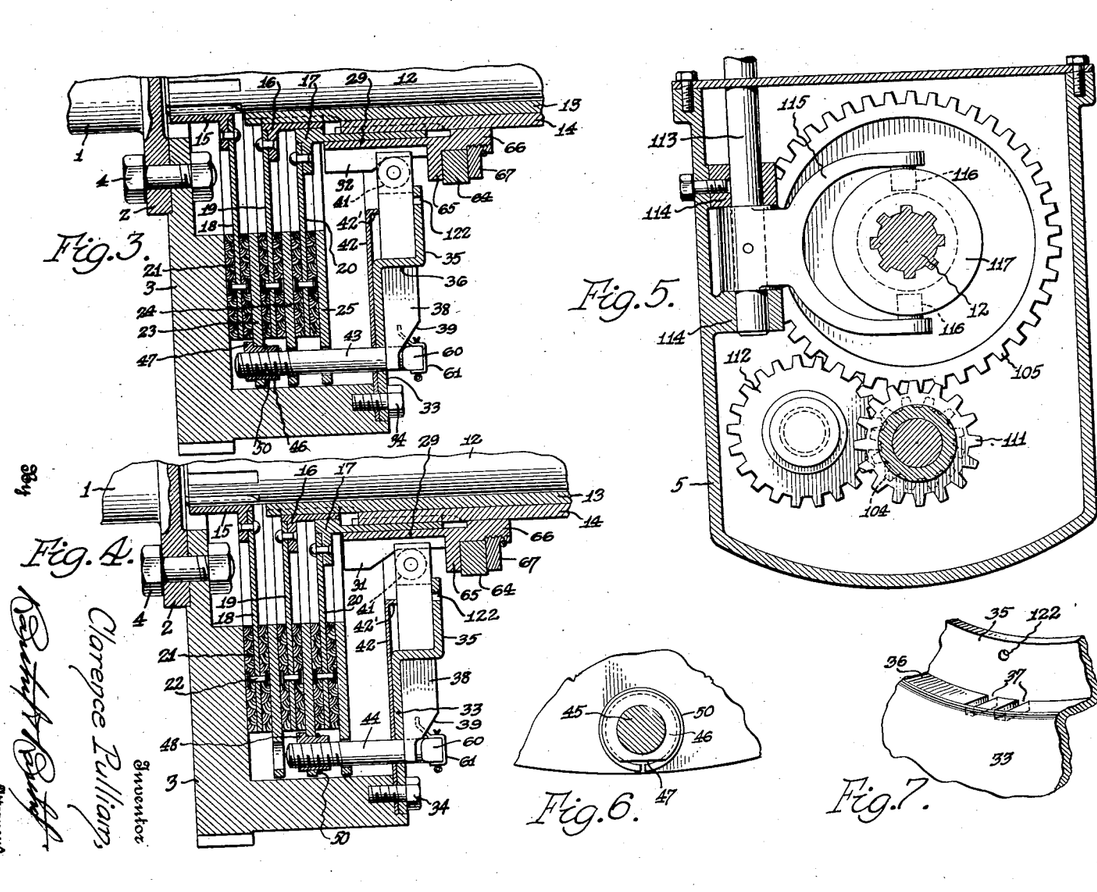
Fig. 3 is a detail of Figure 1, showing the position of the third or high speed cam fingers when the device is in high speed, this section being taken on the line 3—3 of Figure 8.
Fig. 4 is a similar section on the line 4—4 of Figure 8, showing the position of the second speed cam fingers when the device is in high speed or direct drive.
Fig. 5 is a transverse section on the line 5—5 of Figure 1.
Fig. 6 is a detail section at right angles to Figure 4, showing the nut assembly for the clutch disk bolts.
Fig. 7 is a fragmentary perspective view of the cover plate or cage which is penetrated by the cam fingers.

The several clutch rings 23, 24 and 25 are operatively connected to the cam fingers by bolts 43, 44 and 45 respectively. Connection of each bolt to its respective section control ring consists of a nut 46 threaded on the bolt and having a facet 47 as shown in Figure 6. The hole 48 in the ring for receiving the nut has the same contour as the nut, so that the latter will not turn. The nut is prevented from shifting through the ring by an integral flange 48 engaging one face of the ring and a spring wire ring 50 surrounding the nut and engaging the other face of the clutch ring.

The several section control rings and friction disks are normally held as near as possible to the base of the flywheel by springs 51 each having one end bearing against the ring 25 and the other end received in a cup member 52 fitted in the cage 35. At the base of the cup is a neck 53 for receiving the head 55 of a screw 54 which lies in the axis of the cup. On the screw is threaded a collar 56 which is abutted by the remaining end of the spring 51. Directly beneath the head 55, the screw has a reduced neck 57 on which is fitted a disk 58. The head 55 is held in the neck 53 by a cotter pin 59 passed through these parts. This pin prevents the head 55 from turning in the neck, but if it is withdrawn, the screw may be turned to shift the collar 54 and thereby adjust the tension of the spring. The cup 52 is notched at 52', as indicated in Figure 2, to enter the periphery of the collar 56 and hold the same against undesired turning on the bolt. The head 60 of each bolt 43, 44 and 45 carries a flat spring member 61 which extends between the bifurcations 38 to prevent the bolt from turning in the nut.

Across the transmission casing is journaled a rock shaft 62 to which is fixed a shifter fork 63. The sleeve 29 is surrounded by a ring 64 abuttting a flange 65 on the sleeve. The end of the sleeve is threaded at 66 and fitted with a nut 67 which binds the ring 64 against the flange 65 and locks the same in place. A pair of studs 68 projecting from the ring 64 is received in the ends of the fork 63, so that a turning movement imparted to the shaft 62 will shift the sleeve 29 and cams 30, 31 and 32 carried thereby.

Figures 19, 20:
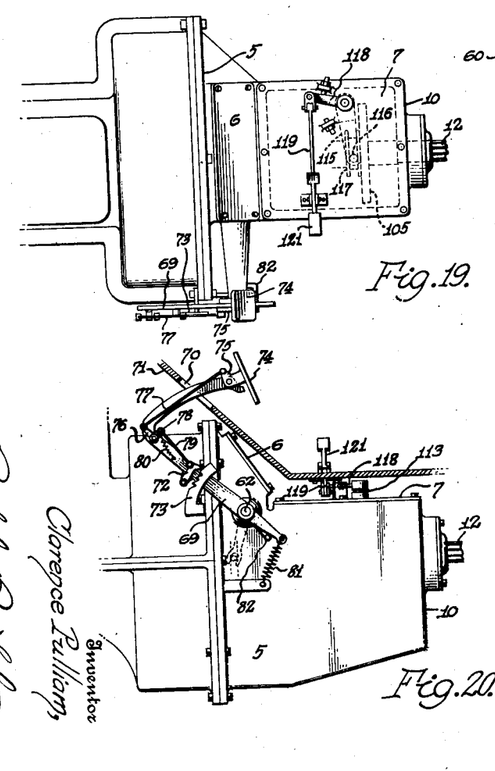
Figure 19 is a plan view of the transmission casing, showing the operating lever mechanism thereon.
Figure 20 is a side elevation corresponding to Figure 19.

For the purpose of actuating the shaft 62, there is provided a bell crank lever 69 (Figure 20) having one end secured externally to the shaft and the other end passed through a slot 70 in the floor board 71 of the vehicle equipped with the invention. The lever carries a pivoted pawl 72 adapted for cooperation with a segmental rack 73 fixed to the transmission housing. To the upper end of the bell crank lever is pivotally attached a pedal 74 having a lug 75 projecting outwardly from the lever. Near the bend of the lever is pivoted another bell crank lever having one of its arms 76 joined by a link 77 to the lug 75. The other arm 78 of the last named bell crank lever is joined by a link 79 to the pawl 72 and by a spring 80 to a fixed point on the larger bell crank lever. The tendency of the spring is to draw the arm 78, and hence the pawl 72 against the ratchet 73. When it is desired to swing the pawl out of a lower notch in order to permit its entry into a higher notch, the upper part of the pedal 74 is depressed, whereby the pawl 72 is retracted from the ratchet. A spring 81 connecting the innermost end of the lever 69 to a fixed point on the transmission housing tends to bring the pedal to its highest position. This movement however is limited by a stud 82 projecting from the transmission housing and engageable by the lever 69.

The portion of the sleeve 13 rearwardly of the bearing 9 is formed with a worm 83 beyond which is another smooth portion 84. On this portion is loosely mounted a clutch element 85 having outer gear teeth 86 and inner gear teeth 87. A ring 88 screwed on the end of the sleeve 13 holds the clutch element 85 against the end of the worm so that it will not shift. On the worm is secured a nut 89 constituting the remaining clutch element and formed with external gear teeth 90 adapted to mesh with the inner gear teeth 87 under the conditions presently to be described. A ring 91 screwed on the sleeve 13 at the beginning of the worm 83 prevents the nut from working off this end of the worm. The member 89 is surrounded by a ring 92 fixed thereto and having notches 93 cut therein. A spring 94 surrounding both clutch elements has one end anchored in the member 85 and its other end adapted to slip past the notches when turning in one direction and to lock in one of the notches in turning in the other direction.

The partition 8 and the end cover 10 previously mentioned support a countershaft 95 parallel to the propeller shaft 12. This shaft carries a gear 96 meshing with a considerably smaller gear 97 formed on the rear end of the sleeve 14. From the gear 96 extends a worm 98 also surrounding the shaft 5 and engaged by a clutch element or nut 99 having outer gear teeth 100. The end of the worm is fitted with a nut 101 to prevent the member 99 from slipping off this end. Next to this nut, the shaft 95 carries a relatively rotatable sleeve 102 having at one end a gear 103 meshing with the gear teeth 86 of the member 85. The gear 103 is smaller than the member 96, and the gear 86 is larger than the member 97. These relations among the gears result in speed reductions as will presently appear. The other end of the sleeve 102 is formed with a small gear 104 meshing with a much larger gear 105 splined on the shaft 12.

Figures 11, 12:
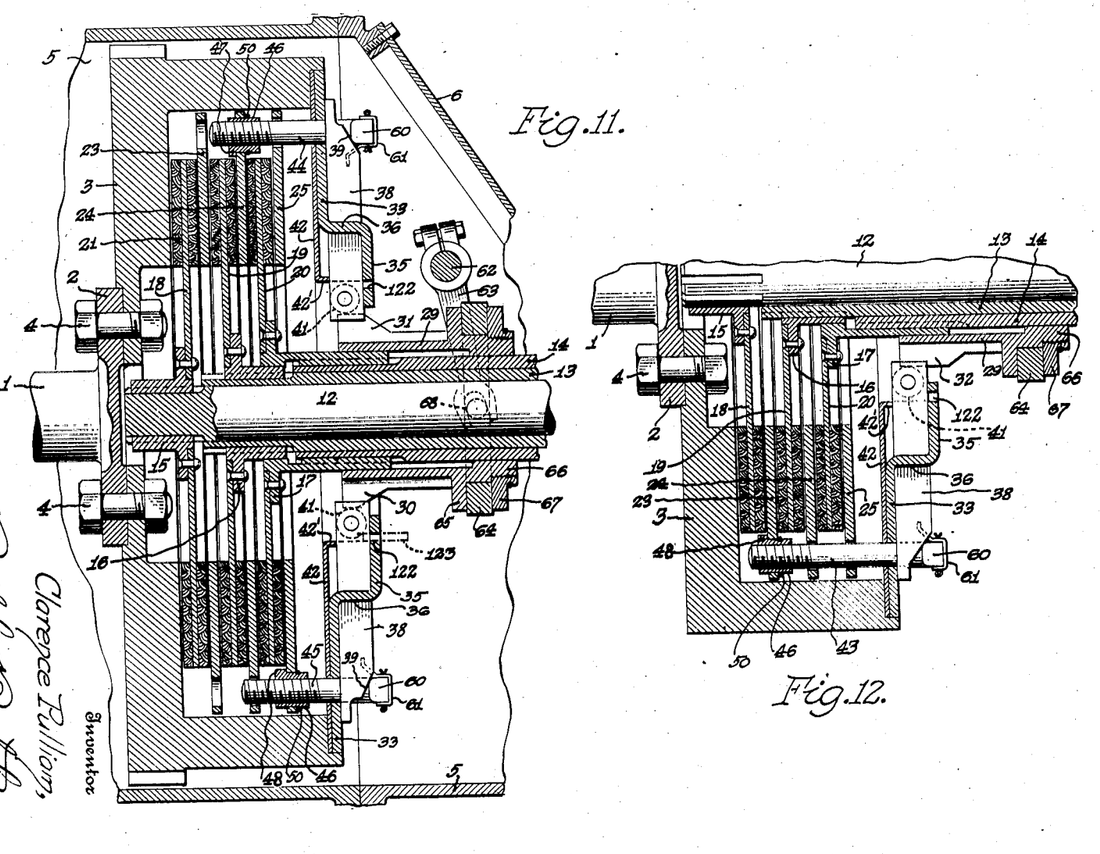
Fig. 11 is a longitudinal section, similar to Figure 1, showing the device in neutral position, i. e., with no drive connection between the power shaft and the propeller shaft.
Fig. 12 is a detail section similar to Figure 11 but in a different radial plane to show the position of the third speed cam fingers.

In the description of the operation of the device for changing speeds, let it be assumed that the parts are in neutral position as shown in figure 11. Here the shifter ring 64 is retracted rearwardly on the shaft 12 as far as possible. The rollers 41 are on the high or level parts of their respective cams 30, 31 and 32, and the cam faces 39 of the fingers 38 are moved to their outermost position so that the bolts 43, 44 and 45 are withdrawn to their limit out of the flywheel. Consequently the clutch rings 23, 24 and 25 are separated from the adjacent friction disks and do not turn the disks. Consequently there is no rotation of the propeller shaft 12, the second speed sleeve 13 of the first speed sleeve 14 to which the several disks are splined.

Figures 13, 14:
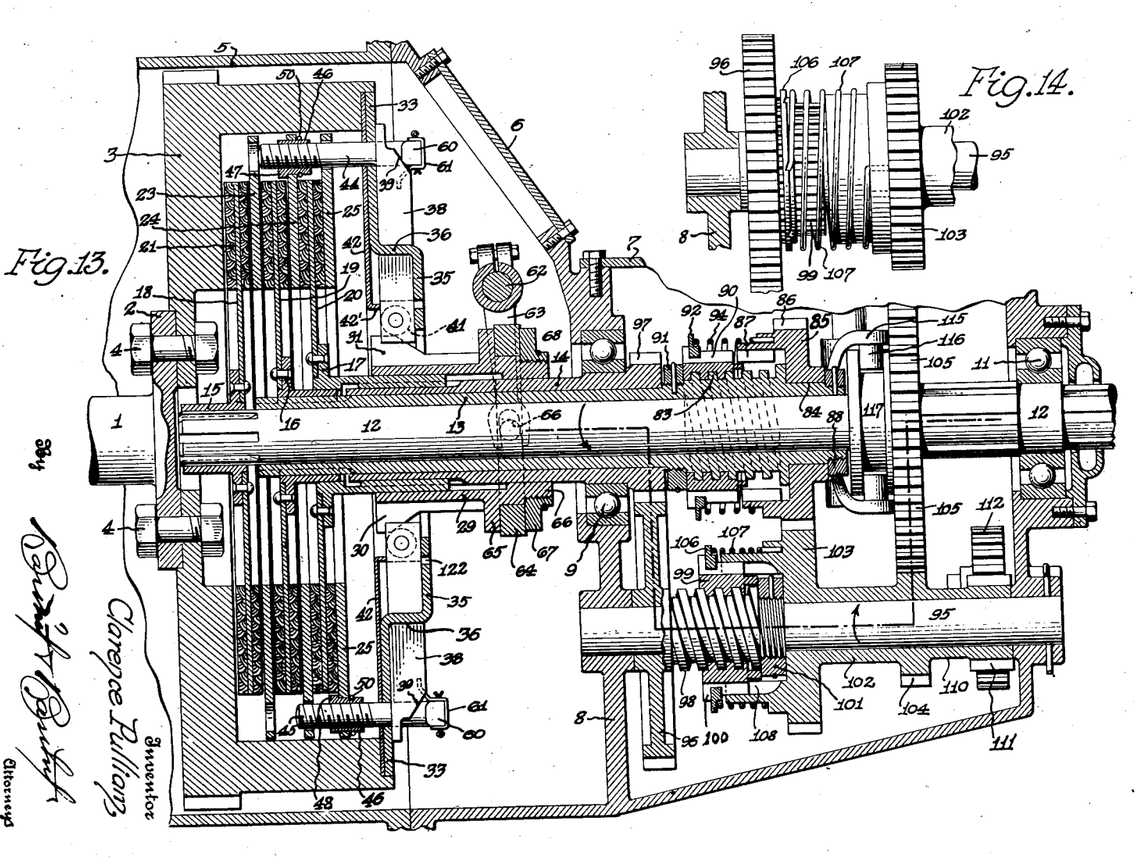
Figure 13 is a longitudinal section showing the device in first or low speed.
Figure 14 is a detail elevation, partly in section, of the differential clutch assembly on the countershaft.

In order to adjust the parts for low speed, the rock shaft 62 is turned until the pawl 72 (Fig. 20) engages the lowest notch in the ratchet 73. This movement advances the cam spider 29 sufficiently to permit the rollers 41 to ride off the low speed cams 30 which have the shortest level portions, while the corresponding portions of the remaining cams remain in engagement with their respective rollers as shown in Figure 13. Consequently the fingers 38 straddling the bolts 45 secured to the first speed section control ring 25 move inwardly of the device under the action of the springs 41' and draw their cam faces 39 away from the corresponding bolt heads 60. The ring 25 fixed to these bolts is now permitted to move into engagement with one face of the adjacent friction disk 20. A driving relation is now established between the flywheel 3 and the disk 20. This condition is shown in Figure 13. The first speed sleeve 14 and gear 97 carried thereby are driven and the latter gear turns the gear 96 on the countershaft 95. The worm 98 tends to turn the nut 99 thereon in the direction shown in Figure 13, but in this direction the notch ring 106 secured on the nut is retained by the spring 107 which is anchored in the member 103. Consequently the nut moves towards the member 103 and into mesh with the teeth 108 thereof as shown in Figure 13. The small gear 104 at the other end of the sleeve 102 imparts motion through the gear 105 to the propeller shaft 12. The speed reduction occurs from the small gear 97 to the larger gear 96 and from the small gear 104 to the larger gear 105.

Figure 15:
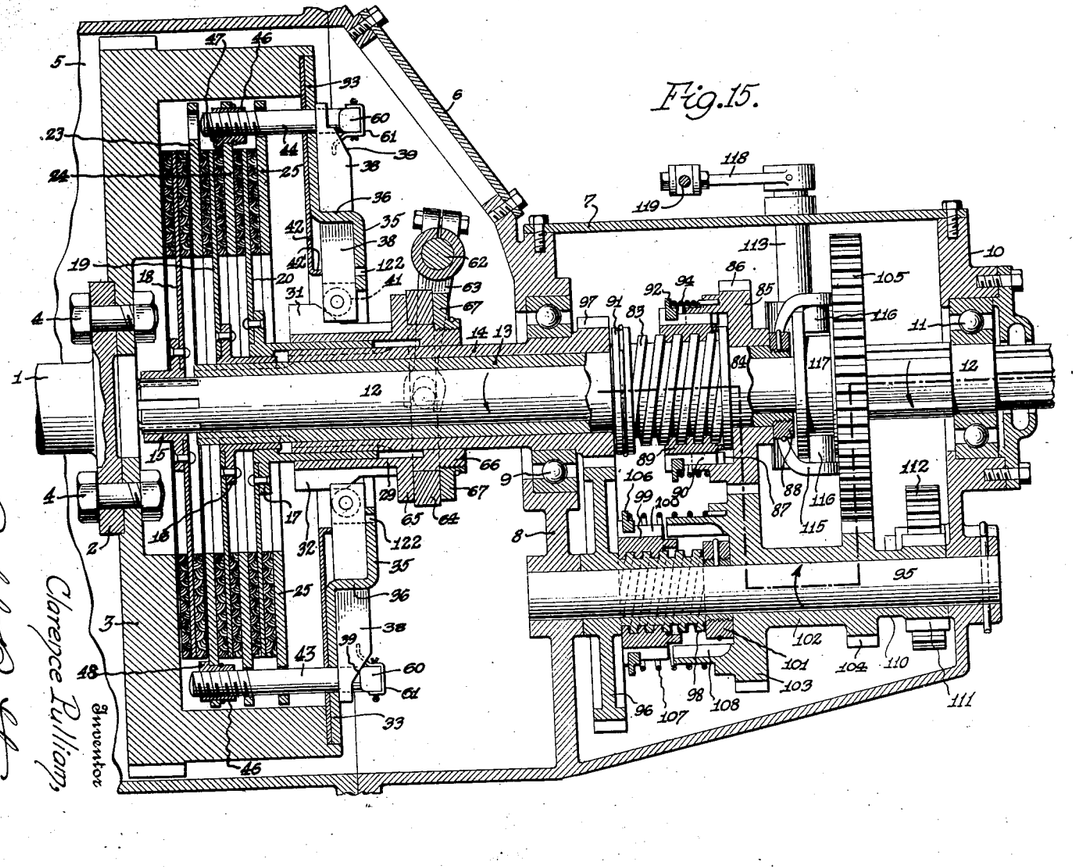
Figure 15 is a longitudinal section showing the device in second or intermediate speed.
Figures 16, 17, 18, 21:
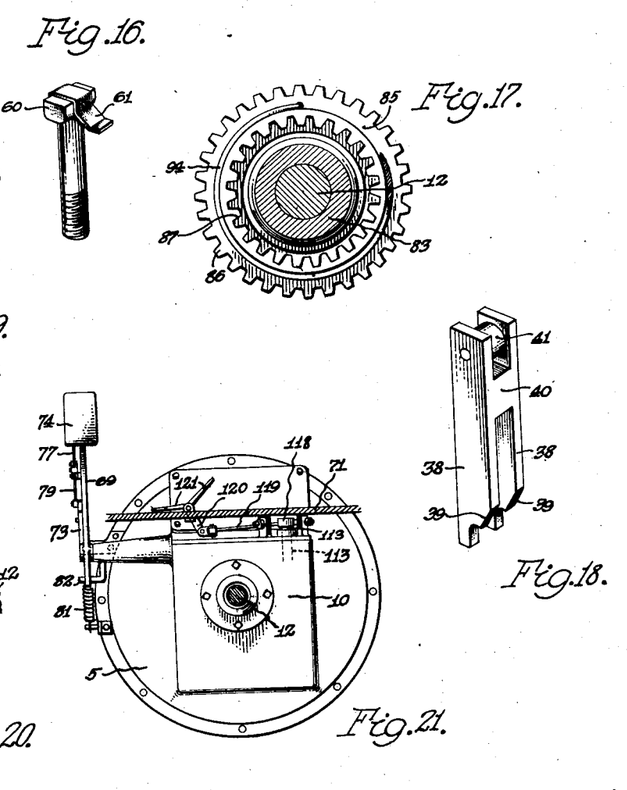
Figure 16 is an isolated perspective view of one of the clutch disk bolts.
Figure 17 is a section on the line 17—17 of Figure 10.
Figure 18 is a perspective view of one of the cam fingers.
Figure 21 is a rear elevation corresponding to Figures 19 and 20.

For driving in second or intermediate speed, the pawl 32 is raised to the next notch in the rack 73. This movement withdraws the level portions of the second speed cams 31 from their respective rollers 41 as shown in Figure 15, while the level portions of the third speed cams 32 are still in contact with their rollers, so that the position of the third speed fingers 38 are unaffected. The second speed fingers however move inwardly of the device and permit the intermediate section control ring 24 to engage the intermediate friction disk 19 in the manner set forth in connection with the first speed adjustment. Both sleeves 13 and 14 are now in rotation, and the turning of the worm 83 advances the nut 90 into mesh with the inner teeth 87 of the clutch element 85 in the manner described in connection with the nut 99.

The speed imparted through the gear teeth 86 to the element 103 of the other clutch is greater than the speed at which the worm 98 tends to turn the nut 99. Consequently the free end of the spring 107 slips past the notches in the ring 106, and there is nothing to hold the nut 99 against rotation.

The spring 107 tends to retain the nut 99 away from the teeth 108, and because of the greater speed required of the nut member in order to effect engagement, these devices on the shafts 12 and 95 may be designated differential clutches. The drive continues from gear 86 to gear 103, gear 104 and gear 105 to the propeller shaft 12. This speed is higher than the first or low speed due to the fact that there is less difference between the gears 86 and 103 than between the gears 97 and 96.

To obtain third or high speed, the pawl 72 is moved to the last notch of the rack 73. The level portions of the high speed cams 32 are withdrawn from their respective rollers, and the corresponding fingers 38 are moved inwardly of the device to permit the remaining bolts 43 to move inwardly of the flywheel and engage the friction disk 18. All three friction disks and section control rings turn together, and the propeller shaft 12 takes the angular velocity of the drive shaft 1 and flywheel 3 through the disk 18 and collar 15. This speed is delivered through gears 105, 104, 103 and 86 to the outer clutch elements 85 which are thus turned at a greater velocity than that which the nuts 89 and 99 tend to acquire, so that the latter are disengaged by the differential action already described.

It will now be seen that certain parts of the clutch mechanism operate in all adjustments or in other words, the first speed control ring 25 and the springs 30 are operative in common to all three speeds. In this respect, the clutch mechanism differs from a multiple clutch of the type shown in my application Serial No. 757,402 wherein each adjustment brings into operation a distinct set of parts.

The sleeve 102 is extended beyond the gear 104, as at 110, and is formed with a pinion 111. Adjacent this pinion and in mesh therewith is an idler gear 112 suitably journalled in the housing. Another rock shaft 113 is mounted in bearings 114 in the housing and carries a shifter fork 115 which has studs 116 extending into a grooved hub 117 provided on the gear 105. By means of this shaft the gear 105 may be moved into engagement with the idler 112 and will be reversed when the driving train includes the sleeve 102. In other words reversal of the shaft 12, is possible in first and second speeds but not in third speed which is a direct drive and does not involve the sleeve 102.

The rock shaft 113 is actuated by an arm 118 secured thereto exteriorly of the housing. To the free end of this arm is secured a drag link 119 joined to another arm 120 adapted to swing in the floor 71. A double pedal 121 is secured to the arm 120 for turning it on its pivot point.

The cage 35 has an aperture 122 adjacent the bridge piece 40 of each finger 38. To adjust the device for wear on the clutch plates, the sleeve 29 is moved to neutral position and the fingers corresponding to the first speed cams 30 are locked by means of pins 123 inserted in the proper apertures. The sleeve 29 is then moved to high position. This permits the fingers corresponding to the second and high speed cams 31 and 32 respectively to move inwardly, thereby clearing the bolt heads 60 corresponding to the second and third speed disks 23 and 24, which are not forced toward the base of the flywheel owing to the fact that the springs 51 are obstructed by the locked ring 23. The bolts corresponding to the second and third speed clutch rings may now be compensated for wear on the clutch plate linings.

To adjust the first speed clutch bolts, the sleeve 29 is moved to neutral position and the pins are moved from the position previously described. The fingers 38 corresponding to the second speed cams 31 are now locked by the pins, and the sleeve is returned to high speed position. The intermediate clutch ring 34, being locked, prevents the ring 23 from moving inwardly, while the cam fingers corresponding to the latter ring drop in sequence to the inward movement of the sleeve and thus clear the heads 60 of the first speed bolts. The bolts are now free to be adjusted.

Although specific embodiments of the invention have been illustrated and described, it will be understood that various alterations in the details of construction may be made without departing from the scope of the invention as indicated by the appended claims.

What I claim is:—

1. A clutch mechanism comprising parallel control members, a single friction member between each pair of parallel control members, a driving member fixed to said control members, shafts fixed to said friction members, a spring behind one of the outermost of said members and adapted to press the contact and friction members together, bolts secured separately to each control member, and means for selectively drawing said bolts against the action of said spring, whereby to selectively release said control members from the adjacent friction members.

2. A transmission mechanism comprising a driving member, clutch members carried thereby, a plurality of transmission shafts, friction members carried by said shafts and disposed intermediate said clutch members, a countershaft geared directly to one of said shafts, differential clutches on one of the remaining transmission shafts and on the countershaft, each clutch including a fixed element, said fixed elements on the two shafts being geared together, and a slidable element adapted to lock with the fixed element.

3. A transmission mechanism comprising a driving member, clutch members carried thereby, a plurality of transmission shafts, friction members carried by said shafts and disposed intermediate said clutch members, a countershaft geared directly to one of said shafts, differential clutches on one of the remaining transmission shafts and on the countershaft, each clutch including a fixed element, said fixed elements on the two shafts being geared together, a slidable element adapted to lock with the fixed element, and a spring between the fixed and slidable element of each clutch and tending to hold said elements apart.

4. A transmission mechanism comprising a driving member, clutch members carried thereby, a plurality of transmission shafts, friction members carried by said shafts and disposed intermediate said clutch members, a countershaft geared directly to one of said shafts, differential clutches on one of the remaining transmission shafts and on the countershaft, each clutch including a fixed element, said fixed elements on the two shafts being geared together, a slidable element adapted to lock with the fixed element, a notched element carried by the slidable element, and a spring having a pawl relation to the notched element and anchored to the fixed element.

5. A transmission mechanism comprising a driving member, clutch members carried thereby, a plurality of transmission shafts, friction members carried by said shafts and disposed intermediate said clutch members, a countershaft geared directly to one of said shafts, differential clutches on one of the remaining transmission shafts and on the countershaft, each clutch including a fixed element, said fixed elements on the two shafts being geared together, and a slidable element threaded on the corresponding shaft and adapted to lock with the fixed element.

6. A transmission mechanism comprising a driving member, clutch members carried thereby, a plurality of transmission shafts, friction members carried by said shafts and disposed intermediate said clutch members, a sleeve slidable over said shafts, and cams carried by said sleeve, fingers slidable radially of said clutch members and engaging said cams, bolts secured to said clutch members and having heads adjacent said fingers, said fingers having cam faces engageable with said heads.

7. A transmission mechanism comprising a driving member, clutch members carried thereby, a plurality of transmission shafts, friction members carried by said shafts and disposed intermediate said clutch members, a sleeve slidable over said shafts, and cams carried by said sleeve, a cage carried by said driving member and enclosing said clutch members and friction members, fingers slidable through said cage radially of said clutch members and engaging said cams, fingers slidable radially of said clutch members and engaging said cams, bolts secured to said clutch members and having heads adjacent said fingers, said fingers having cam faces engageable with said heads.

8. A transmission mechanism comprising a driving member, clutch members carried thereby, a plurality of transmission shafts, friction members carried by said shafts and disposed intermediate said clutch members, a sleeve slidable over said shafts, and cams carried by said sleeve, a cage carried by said driving member and enclosing said clutch members and friction members, fingers slidable through said cage radially of said clutch members and engaging said cams, fingers slidable radially of said clutch members and engaging said cams, bolts secured to said clutch members and having heads adjacent said fingers, said fingers having cam faces engageable with said heads, bridge pieces carried by said fingers, said cage having apertures near said pieces, whereby pins may be inserted through said apertures to engage said bridge pieces and maintain said fingers spaced from the cams for adjustment purposes.

9. A transmission mechanism comprising a driving member, clutch members carried thereby, a plurality of transmission shafts, friction members carried by said shafts and disposed intermediate said clutch members, a sleeve slidable over said shafts, and cams of unequal length carried by said sleeve, a cage carried by said driving member, and enclosing said clutch members and friction members, fingers slidable through said cage radially of said clutch members and engaging said cams, bolts secured to said clutch members and having heads adjacent said fingers, said fingers having cam faces engageable with said heads, springs between said cage and fingers and tending to hold the fingers in engagement with the cams.

In testimony whereof I affix my signature.

CLARENCE PULLIAM.